(12) United States Patent
Tzou et al.

(10) Patent No.: US 12,032,409 B2
(45) Date of Patent: Jul. 9, 2024

(54) ELECTRONIC DEVICE

(71) Applicants: Jyh-Chyang Tzou, Taipei (TW); I Ta Tsai, Taipei (TW); Meng Ju Wu, Taipei (TW)

(72) Inventors: Jyh-Chyang Tzou, Taipei (TW); I Ta Tsai, Taipei (TW); Meng Ju Wu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/985,163

(22) Filed: Nov. 11, 2022

(65) Prior Publication Data
US 2023/0076692 A1 Mar. 9, 2023

Related U.S. Application Data

(62) Division of application No. 17/037,584, filed on Sep. 29, 2020, now Pat. No. 11,537,164.

(60) Provisional application No. 62/940,213, filed on Nov. 25, 2019.

(51) Int. Cl.
*G06F 3/04883* (2022.01)
*G06F 1/16* (2006.01)
*G06F 3/0484* (2022.01)

(52) U.S. Cl.
CPC .......... *G06F 1/1643* (2013.01); *G06F 1/1618* (2013.01); *G06F 1/165* (2013.01); *G06F 3/0484* (2013.01); *G06F 3/04883* (2013.01)

(58) Field of Classification Search
CPC ...................................... G06F 1/618
USPC ........................................ 361/679
See application file for complete search history.

(56) References Cited

U.S. PATENT DOCUMENTS

| | | | |
|---|---|---|---|
| 5,926,780 A * | 7/1999 | Fox | A63B 24/0021 702/150 |
| 8,842,057 B2 * | 9/2014 | Sirpal | G06F 1/1618 345/1.3 |
| 9,001,819 B1 * | 4/2015 | Or-Bach | H04L 65/4015 370/352 |

(Continued)

FOREIGN PATENT DOCUMENTS

| CN | 101989099 | 3/2011 |
|---|---|---|
| CN | 102138112 | 7/2011 |

OTHER PUBLICATIONS

"Office Action of China Counterpart Application", issued on Mar. 7, 2024, p. 1-p. 9.

*Primary Examiner* — Reza Nabi
(74) *Attorney, Agent, or Firm* — JCIPRNET

(57) ABSTRACT

An electronic device is provided, including first and second bodies, a processing module, a touch display panel, and at least one sensing unit. The second body is rotatably connected to the first body. The processing module is disposed in the first body or the second body. The touch display panel is disposed on the second body, is coupled to the processing module, and has a main display part, and first and second display parts. The sensing unit is disposed in the first body or the second body and coupled to the processing module. When the sensing unit detects the first and second bodies are folded relative to each other, the processing module is switched to a second mode, wherein in the second mode, the main display part is activated, the first display part and the second display part are adapted to operate synchronously or operate individually.

10 Claims, 13 Drawing Sheets

(56) References Cited

U.S. PATENT DOCUMENTS

| | | | | |
|---|---|---|---|---|
| 9,164,540 B2* | 10/2015 | Sirpal | ............... | G06F 3/04842 |
| 9,383,770 B2* | 7/2016 | Teltz | ................ | G06F 1/1616 |
| 9,665,952 B2* | 5/2017 | Du | ................ | G06F 3/04842 |
| 10,225,471 B2* | 3/2019 | Poindexter, Jr. | ....... | H04N 23/63 |
| 10,649,620 B2* | 5/2020 | Fujii | ................ | G06F 3/0482 |
| 2005/0043996 A1* | 2/2005 | Silver | ................ | G06Q 50/12 |
| | | | | 705/15 |
| 2005/0093868 A1* | 5/2005 | Hinckley | ............. | H04W 4/21 |
| | | | | 345/506 |
| 2006/0044262 A1* | 3/2006 | Ito | ................ | G06F 1/1656 |
| | | | | 345/156 |
| 2007/0124503 A1* | 5/2007 | Ramos | ............. | H04W 4/023 |
| | | | | 709/248 |
| 2008/0238706 A1* | 10/2008 | Kenwright | ............ | G09F 27/00 |
| | | | | 340/815.4 |
| 2009/0034173 A1* | 2/2009 | Shaum | ............. | G06F 1/1643 |
| | | | | 361/679.28 |
| 2012/0081280 A1* | 4/2012 | Schrock | ............ | G06F 3/04883 |
| | | | | 345/156 |
| 2012/0274565 A1* | 11/2012 | Moser | ................ | G06F 1/1649 |
| | | | | 345/1.3 |
| 2013/0076598 A1* | 3/2013 | Sirpal | ............. | G06F 3/1446 |
| | | | | 345/1.3 |
| 2013/0244784 A1* | 9/2013 | Assa | ................ | G06F 3/0416 |
| | | | | 463/40 |
| 2014/0035810 A1* | 2/2014 | Shen | ................ | G06F 1/1616 |
| | | | | 345/156 |
| 2014/0078535 A1* | 3/2014 | Okada | ............... | H04N 1/00411 |
| | | | | 358/1.13 |
| 2014/0254080 A1* | 9/2014 | Huang | ................ | G06F 1/1616 |
| | | | | 361/679.11 |
| 2014/0304947 A1* | 10/2014 | Wang | ................ | G06F 1/1616 |
| | | | | 16/325 |
| 2015/0042674 A1* | 2/2015 | Lin | ................ | G09G 5/14 |
| | | | | 345/619 |
| 2016/0110149 A1* | 4/2016 | Sirpal | ............. | H04W 72/563 |
| | | | | 345/1.3 |
| 2016/0192117 A1* | 6/2016 | Zhao | ................ | H04W 4/80 |
| | | | | 345/158 |
| 2019/0174069 A1* | 6/2019 | Poindexter, Jr. | .... | G06F 3/04886 |
| 2020/0169522 A1* | 5/2020 | Lee | ................ | H04L 51/216 |
| 2020/0259995 A1* | 8/2020 | Ito | ................ | G06F 3/04817 |

* cited by examiner

ELECTRONIC DEVICE

CROSS-REFERENCE TO RELATED APPLICATION

This application is a divisional application of and claims the priority benefit of U.S. application Ser. No. 17/037,584, filed on Sep. 29, 2020, which claims the priority benefit of U.S. provisional application Ser. No. 62/940,213, filed on Nov. 25, 2019. The entirety of each of the above-mentioned patent applications is hereby incorporated by reference herein and made a part of this specification.

BACKGROUND

Technical Field

The disclosure relates to an electronic device; particularly, the disclosure relates to an electronic device in combination with a flexible panel.

Description of Related Art

As consumers demands for audio-visual entertainment and enjoyment increasingly and pursues novel appearances of products, manufacturers are competing in development and launching various electronic products having a high screen ratio, and a design that emphasizes narrow borders is regarded as the mainstream characteristic of high-end electronic products. Current manufacturers and designers continue to improve the technology of reducing the border or the wall thickness of case assembly, but narrow-border screens still have their limits. Obvious black frames still exist on outer edges of the existing narrow-border screens. When a plurality of screens are displaying contents synchronously, the black frame on each screen causes discontinuity of the image, lessening the immersive experience of the users when watching.

In addition, existing electronic products such as laptops or tablet computers have a touch screen function so that the users can directly touch the surface of the screen for operation. However, the existing touch screen has the following disadvantages: hands of the user block the display image in other areas of the screen, and fingerprints are residual on the surface of the screen after being touched.

SUMMARY

The disclosure provides an electronic device, in combination with a bendable touch display panel configured to hide borders on left and right sides of the electronic device, which thus has a visual effect of bilateral boundlessness. At the same time, two sides of the touch display panel can be planned as a touch area or a display area, which facilitates touch operation and simple message display.

An electronic device of the disclosure includes a first body, a second body, a processing module, a touch display panel, and at least one sensing unit. The second body is rotatably connected to the first body. The processing module is disposed in the first body or the second body. The touch display panel is disposed on the second body and coupled to the processing module. The touch display panel has a main display part, a first display part, and a second display part. The first display part and the second display part are located on two opposite sides of the second body. At least one sensing unit is disposed in the first body or the second body and coupled to the processing module. Herein, when the at least one sensing unit detects that the first body and the second body are closed relative to each other, the processing module is switched to a first mode. In the first mode, the main display part is deactivated, and the first display part and the second display part are adapted to synchronously display or individually display a first message, a second message, or a third message.

An electronic device of the disclosure includes a first body, a second body, a processing module, a touch display panel, and at least one sensing unit. The second body is rotatably connected to the first body. The processing module is disposed in the first body or the second body. The touch display panel is disposed on the second body and coupled to the processing module. The touch display panel has a main display part, a first display part, and a second display part. The first display part and the second display part are located on two opposite sides of the second body. At least one sensing unit is disposed in the first body or the second body and coupled to the processing module. Herein, when the at least one sensing unit detects that the first body and the second body are unfolded relative to each other, the processing module is switched to a second mode. In the second mode, the main display part is activated, the first display part and the second display part are adapted to operate synchronously or operate individually, and the first display part or the second display part is adapted to detect an external touch force to thereby transmit a corresponding control command to the processing module.

A mode switching method of an electronic device of the disclosure includes an electronic device including a first body, a second body, a processing module, a touch display panel, and at least one sensing unit. The first body and the second body are closed relative to each other. The at least one sensing unit detects that the first body and the second body are closed to each other, so that the processing module is switched to a first mode. In the first mode, a first display part and a second display part of the touch display panel are adapted to synchronously display or individually display a first message, a second message, or a third message. The first body and the second body are unfolded relative to each other. The at least one sensing unit detects that the first body and the second body are unfolded relative to each other, so that the processing module is switched to a second mode. In the second mode, the first display part and the second display part of the touch display panel are adapted to operate synchronously or operate individually.

Based on the foregoing, the electronic device of the disclosure has a bendable touch display panel adapted to generate deformation and disposed on the second body, thereby hiding the borders on the left and right sides of the second body to have a visual effect of bilateral boundlessness. At the same time, the first display part and a second display part of the touch display panel may be planned as the touch area, which facilitates the touch operation. The user can perform touch interaction through the first display part and the second display part of the touch display panel, which prevents the hand of the user from blocking the main display part of the touch display panel and the display image thereof, and also decreases fingerprint residue on the main display part.

In addition, when the electronic device is switched to the first mode, the first display part and the second display part of the touch display panel will become the display area, and display a simple message, reminding the user of important information.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
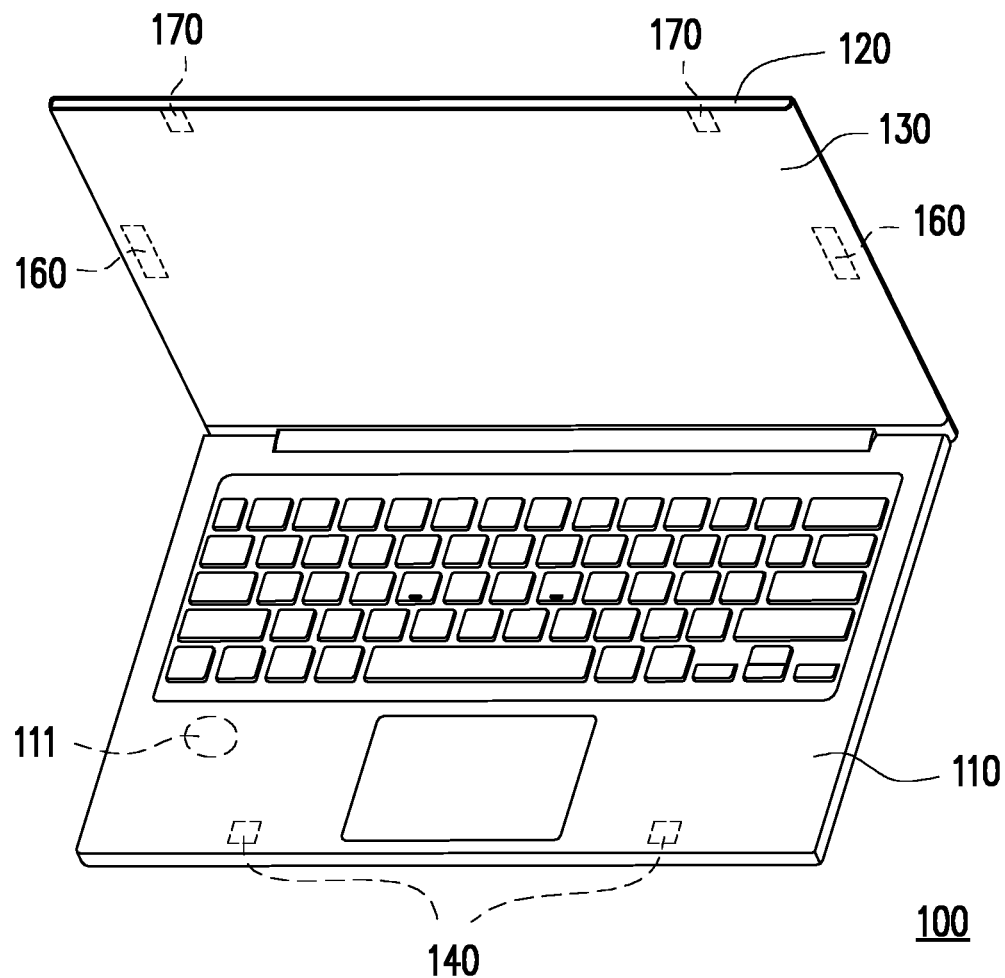
FIG. 1A is a three-dimensional schematic diagram of an electronic device according to an embodiment of the disclosure.
Figure 1B:
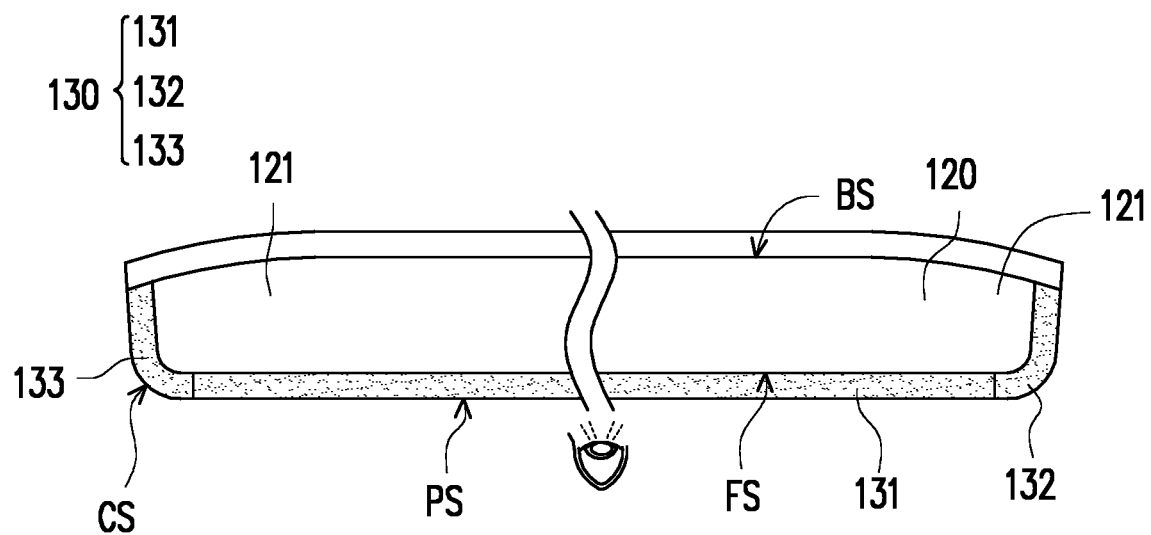
FIG. 1B is a schematic front plan view of a second body and a touch display panel of the electronic device of FIG. 1A.
Figure 1C:
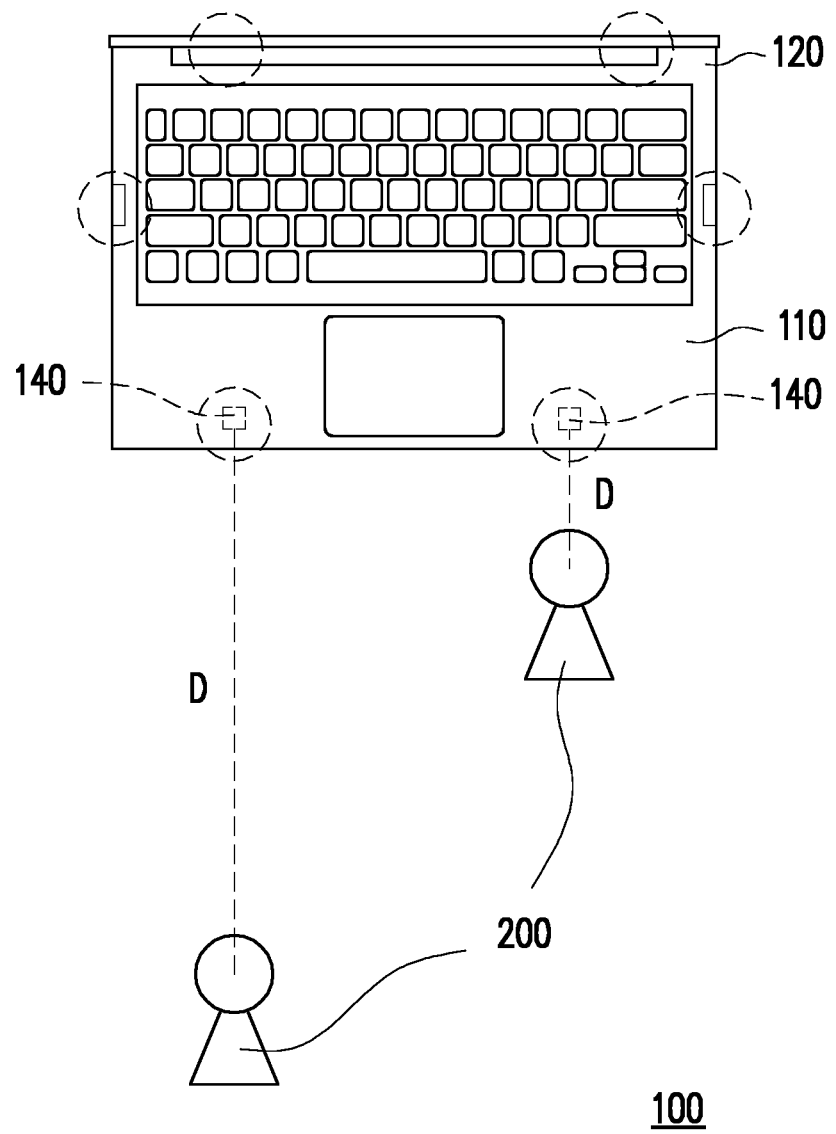
FIG. 1C is a schematic diagram of distance sensing of the electronic device in FIG. 1A.

FIG. 1A is a three-dimensional schematic diagram of an electronic device according to an embodiment of the disclosure. FIG. 1B is a schematic front plan view of a second body and a touch display panel of the electronic device of FIG. 1A. FIG. 1C is a schematic diagram of distance sensing of the electronic device in FIG. 1A.

Figure 2A:
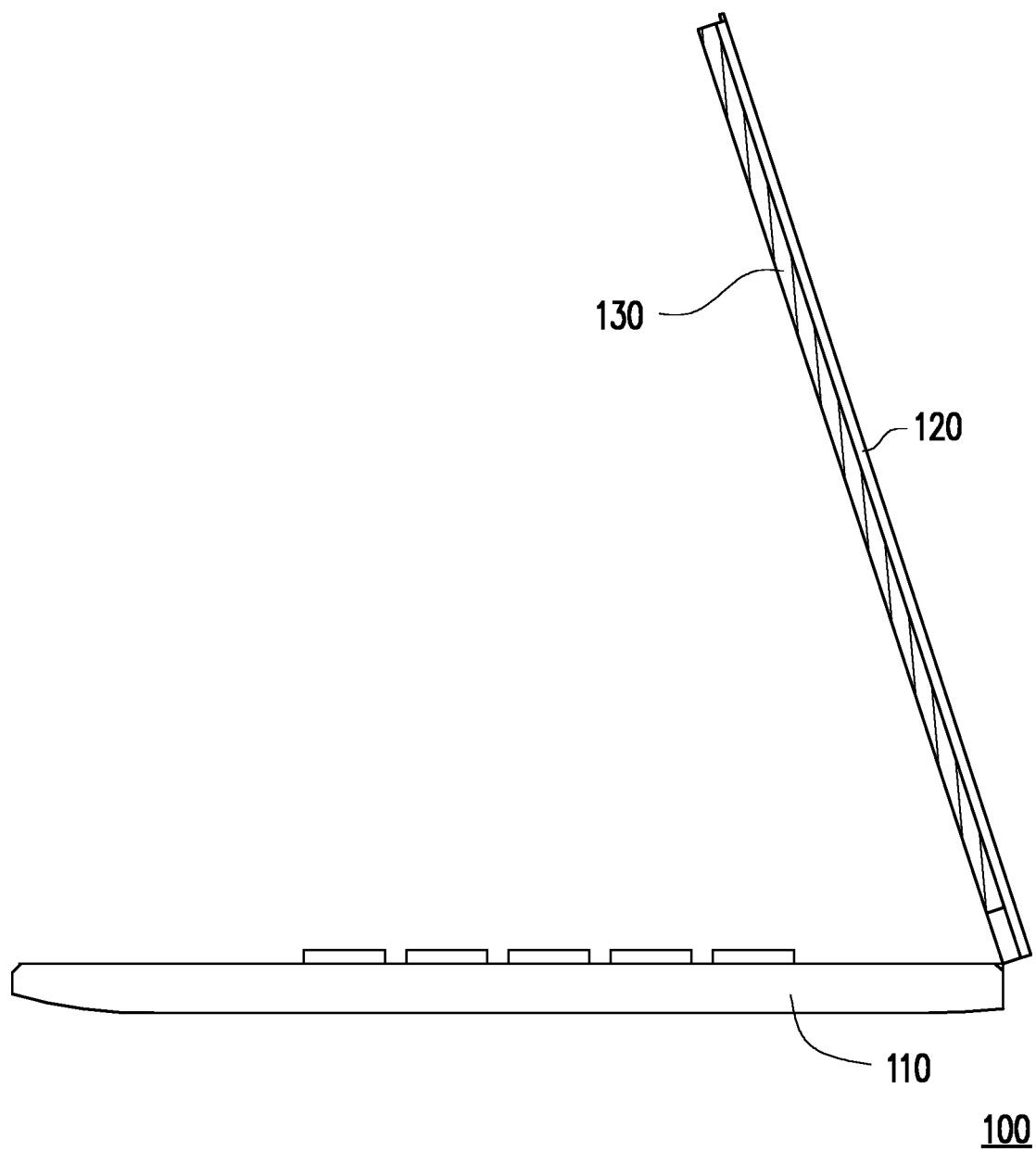
FIG. 2A is a schematic plan view of the electronic device of FIG. 1A in an unfolded state displaying a first message.
Figure 2B:
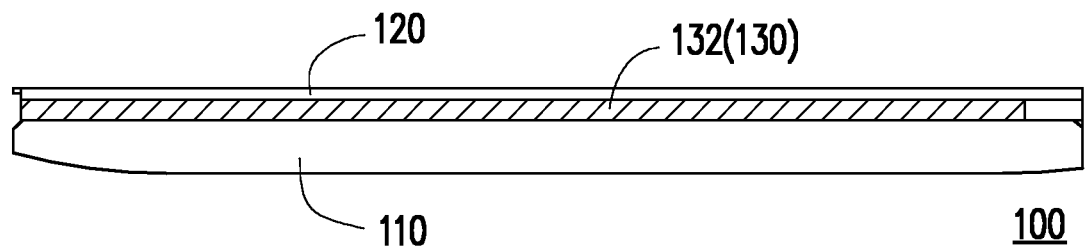
FIG. 2B is a schematic plan view of the electronic device of FIG. 1A in a closed state displaying a first message.
Figure 2C:
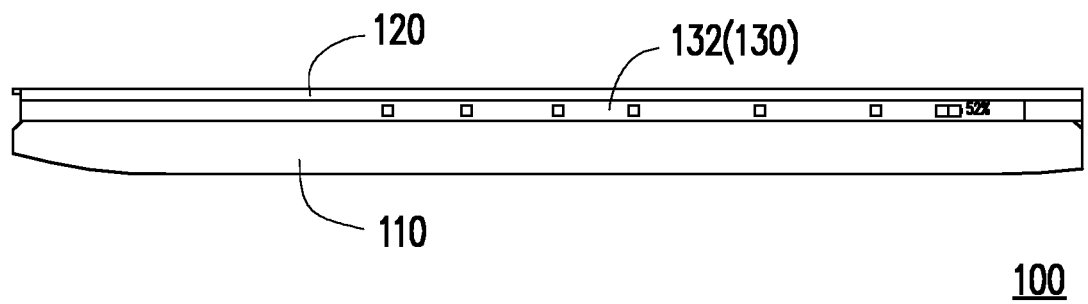
FIG. 2C is a schematic plan view of the electronic device of FIG. 2B displaying a second message.
Figure 2D:
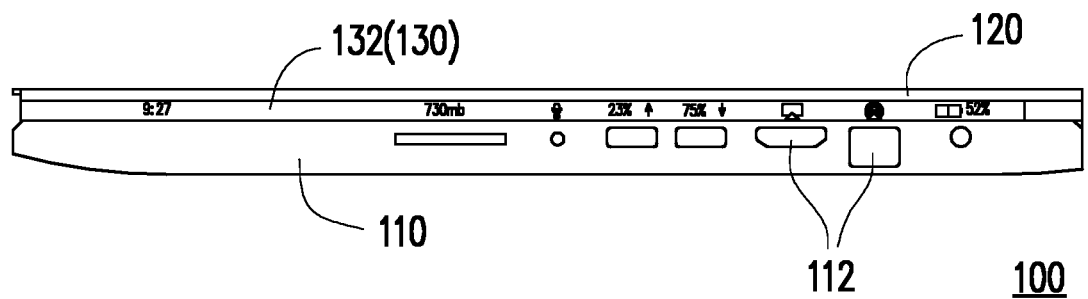
FIG. 2D is a schematic plan view of the electronic device of FIG. 2B displaying a third message.

FIG. 2A is a schematic plan view of the electronic device of FIG. 1A in an unfolded state displaying a first message. FIG. 2B is a schematic plan view of the electronic device of FIG. 1A in a closed state displaying a first message. FIG. 2C is a schematic plan view of the electronic device of FIG. 2B displaying a second message. FIG. 2D is a schematic plan view of the electronic device of FIG. 2B displaying a third message.

With reference to FIG. 1A and FIG. 1B, an electronic device 100 of the disclosure includes a first body 110, a second body 120, a processing module 111, a touch display panel 130, and at least one sensing unit 140. For example, the electronic device 100 is a notebook computer, the first body 110 is a host and is configured to be installed with various necessary devices such as computation, storage, and power supply devices, a keyboard, and a mouse among other devices, and the second body 120 is a touch display body and is configured for outputting images and audio and inputting control commands.

The second body 120 is rotatably connected to the first body 110. To be specific, the second body 120 is connected to the first body 110 through a pivot module, so the second body 120 may rotate relative to the first body 110 through the pivot module to be switched to an unfold state and a closed state. The processing module 111 may be disposed in the first body 110 or the second body 120. In this embodiment, for example, the processing module 111 is disposed in the first body 110, and may be a central processing unit (CPU), or another programmable general-purpose or special-purpose micro control unit (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or another similar element or a combination of the above elements. Alternatively, the processing module 111 may as well be, for example, a hardware circuit that is designed with a hardware description language (HDL) or another digital circuit design well-known to people having common knowledge in the field, and that is implemented with a field programmable gate array (FPGA), a complex programmable logic device (CPLD), or an application-specific integrated circuit (ASIC), but is not limited thereto.

The touch display panel 130 is disposed on the second body 120 and is coupled to the processing module 111. The touch display panel 130 may, for example, adopt a flexible panel and is exhibited in a U-shaped structure (see FIG. 1B) to cover borders 121 on two sides of the second body 120, so that the touch display panel 130 has properties of visual borderlessness and high screen-to-body ratio. To be specific, the touch display panel 130 has a main display part 131, a first display part 132, and a second display part 133. The main display part 131 fits a front surface FS of the second body 120. The first display part 132 and the second display part 133 are formed on two opposite sides of the main display part 131 and are bent relative to the main display part 131, so that the first display part 132 and the second display part 133 cover the borders 121 on the sides of the second body 120. Furthermore, the main display part 131, the first display part 132, and the second display part 133 of the touch display panel 130 may display contents in combination at the same time, and the main display part 131, the first display part 132, and the second display part 133 of the touch display panel 130 may also display contents individually or not display contents.

In this embodiment, the main display part 131 has a flat surface PS, and the first display part 132 and the second display part 133 include two curved surfaces CS connected to the flat surface PS. In another embodiment, the main display part has a flat surface and two curved surfaces, and the first display part and the second display part are respectively connected to the two curved surfaces of the main display part. In another embodiment, the main display part may be a curved screen or a flat screen.

The at least one sensing unit 140 is dispose in the first body 110 or the second body 120 and is coupled to the processing module 111. In this embodiment, the at least one sensing unit 140 may, for example, adopt an infrared sensor, an ultrasonic sensor, a light source sensor, or another sensor configured to detect distance. Besides, the at least one sensing unit 140 includes a plurality of sensing units, which are disposed surrounding the first body 110 or the second body 120 and which are configured to detect a distance D between the first body 110 and the second body 120 or to detect whether or not a user 200 is close to the electronic device 100.

With reference to FIG. 1A, FIG. 1B, and FIG. 2A, when the first body 110 and the second body 120 are unfolded relative to each other, the at least one sensing unit 140 detects that the touch display panel 130 and the first body 110 are separated from each other and transmits a corresponding signal to the processing module 111, so that the processing module 111 is switched to a second mode. In the second mode, the main display part 131 is activated, and the first display part 132 and the second display part 133 are adapted to operate synchronously or operate individually.

In short, the first display part 132 and the second display part 133 may, in response to a display content of the main display part 131, emit lights of corresponding colors and rhythms to achieve an effect of complementary display or an ambient light that enhances vision. Moreover, lights of different situations (e.g., flashing light, a light strip, or mood lighting) may also be emitted to notify the user of messages regarding emergency, download progress, mail, communication software, or other similar messages. The first display part 132 and the second display part 133 have a touch function and may serve as a quick operation area for various functions. The first display part 132 and/or the second display part 133 are adapted to detect an external touch force to thereby transmit a corresponding control command to the processing module 111, achieving a diverse and efficient operating experience.

With reference to FIG. 2B to FIG. 2D, when the first body 110 and the second body 120 are closed relative to each other, the at least one sensing unit 140 detects that a vertical height VH is present between the touch display panel 130 and a bottom B of the first body 110 and transmits a corresponding signal to the processing module 111 to switch the processing module 111 to the first mode (e.g., a sleep mode or a standby mode). In the first mode, the main display part 131 is deactivated, and the first display part 132 and the second display part 133 are adapted to synchronously or individually display a first message, a second message, or a third message. In addition, when the main display part 131 is deactivated, for example, a power supply to the main display part 131 is cut off, a backlight of the main display part 131 is deactivated, or each display pixel of the main display part 131 is exhibited as black and forms a black screen.

To be specific, the at least one sensing unit 140 detects a distance D of the user 200 relative to the first body 110 or the second body 120. When the distance D is greater than a predetermined value (e.g., 50 cm), at least one of the first display part 132 and the second display part 133 displays the first message, which is flashing light, color-changing light, or an abstract light strip representing data transmission and operation status (see FIG. 2B). When the distance D is less than the predetermined value (e.g., 50 cm), at least one of the first display part 132 and the second display part 133 displays the detailed second message, which is a scrolling text or a simple icon, so that the user knows of a mail or a message, or knows that a download task is complete through the second message (see FIG. 2C).

In short, the first display part 132 and second display part 133 may serve as a side message display center of the electronic device 100. In the closed state, contents such as the status of the notebook computer and relevant notifications are displayed on a side, and are automatically adjusted between the first message and the second message according to the distance from the user.

With reference to FIG. 2D, the first body 110 includes a plurality of connection ports 112 disposed on one side of the first body 110 and aligned with the first display part 132 or the second display part 133. When the first body 110 and the second body 120 are closed relative to each other, the first display part 132 and the second display part 133 are located above the plurality of connection ports 112, and the first display part 132 and the second display part 133 display the third message corresponding to at least a part of the plurality of connection ports 112. In addition, when the distance D of the user 200 are greater than twice the predetermined value (100 cm), at least one of the first display part 132 and the second display part 133 displays the third message, so that the electronic device 100 in the closed state may better display a respective status of each of the plurality of connection ports 112 in a corresponding position. The third message includes battery charge, storage capacity, download traffic, upload traffic, network connection status, and connection status of input and output devices, so that the user can know of basic operation contents of the electronic device 100.

Furthermore, when the main display part 131 plays a game image or a movie video, the first display part 132 or the second display part 133 may be automatically switched to a thinned black border state to prevent the image or video from deformation.

Figure 3A:
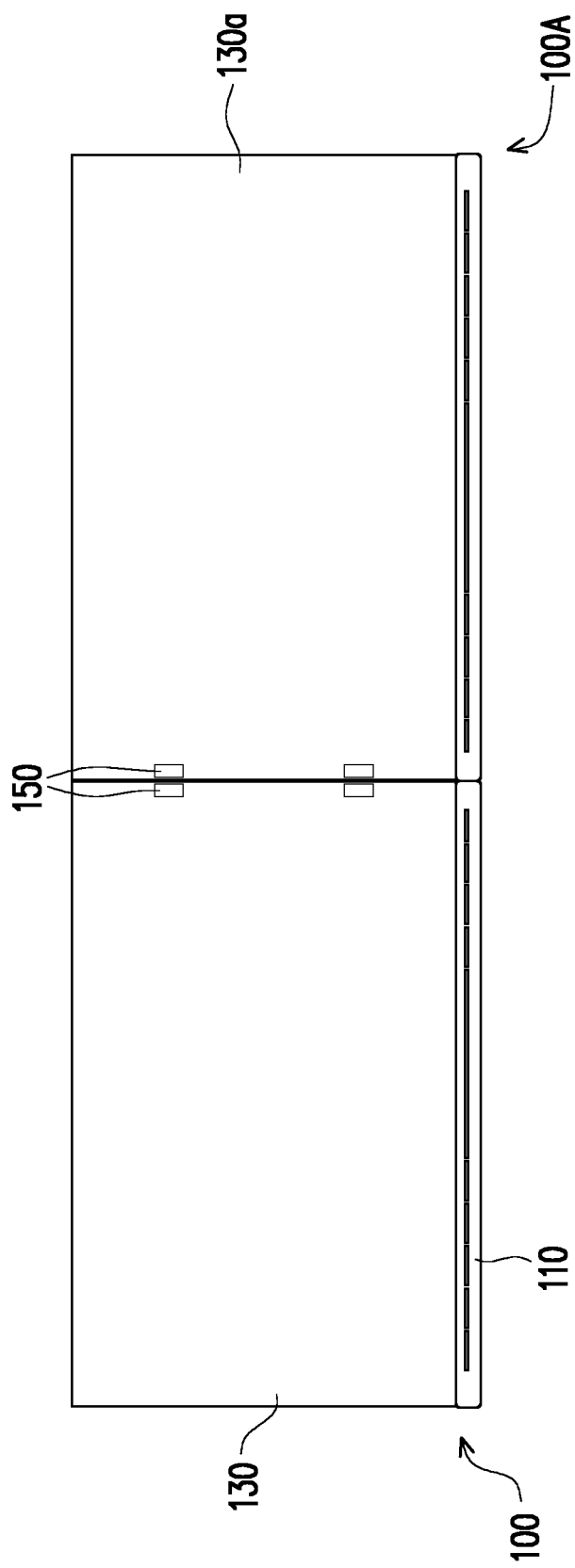
FIG. 3A is a schematic front view of two electronic devices in combination according to another embodiment of the disclosure.
Figure 3B:
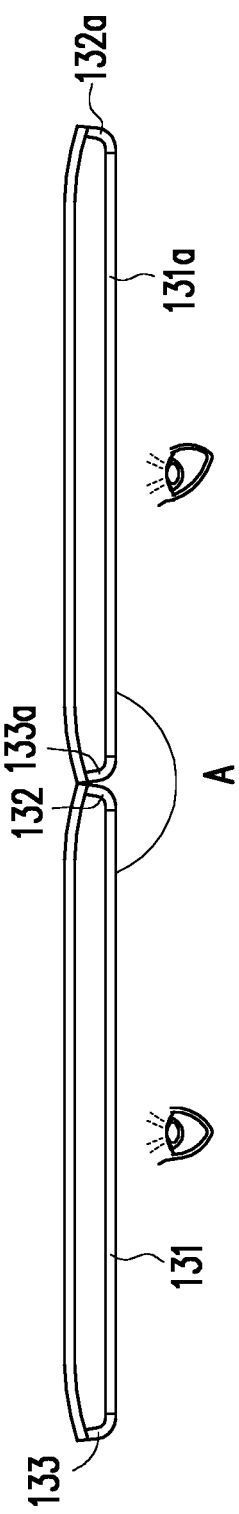
FIG. 3B is a schematic plan view of second bodies and touch display panels of the two electronic devices of FIG. 3A.
Figure 3C:
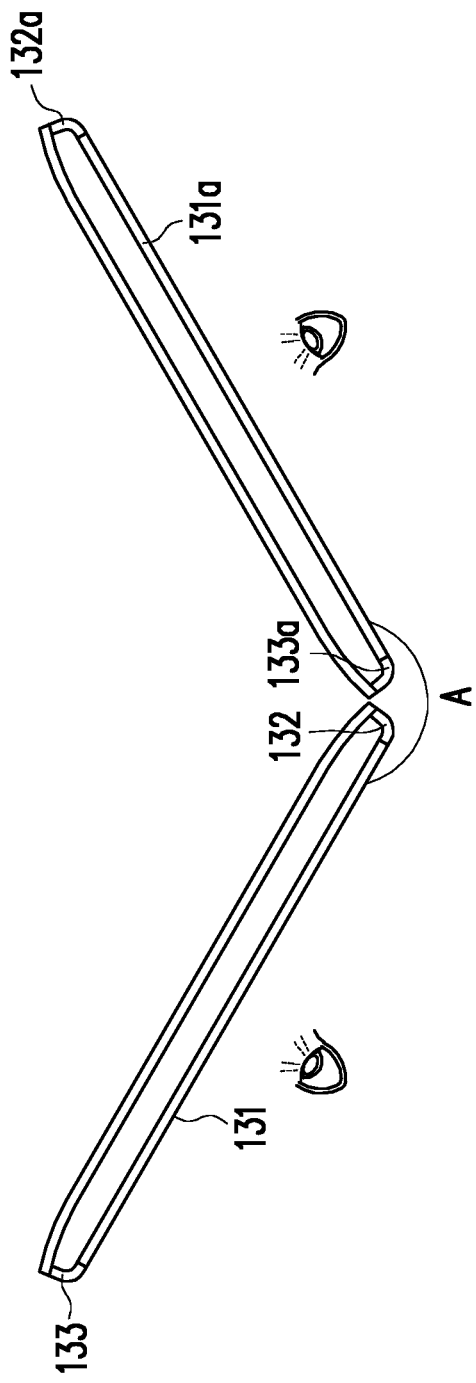
FIG. 3C is a schematic plan view of the two electronic devices of FIG. 3A with an included angle greater than 180 degrees.
Figure 3D:
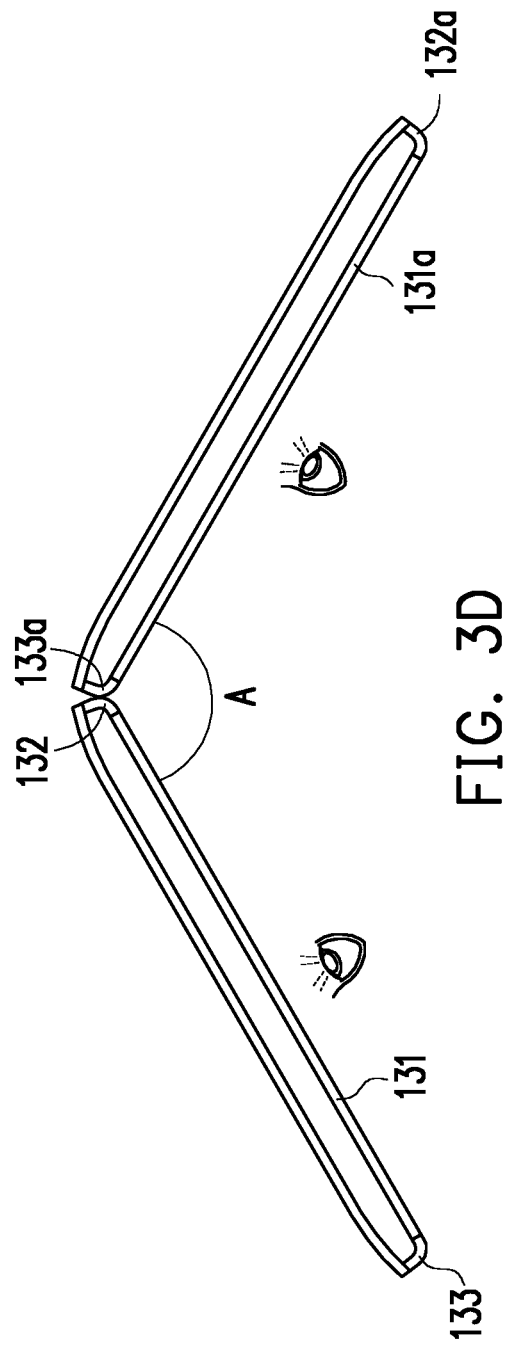
FIG. 3D is a schematic plan view of the two electronic devices of FIG. 3A with an included angle less than 180 degrees.

FIG. 3A is a schematic front view of two electronic devices in combination according to another embodiment of the disclosure. FIG. 3B is a schematic plan view of second bodies and touch display panels of the two electronic devices of FIG. 3A. FIG. 3C is a schematic plan view of the two electronic devices of FIG. 3A with an included angle greater than 180 degrees. FIG. 3D is a schematic plan view of the two electronic devices of FIG. 3A with an included angle less than 180 degrees.

With reference to FIG. 3A and FIG. 3B, in this embodiment, two electronic devices 100 and 100A abut each other and are applied in combination. A first display part 132a of another touch display panel 130a is in contact with the second display part 133 of the touch display panel 130, or a second display part 133a of the another touch display panel 130a is in contact with the first display part 132 of the touch display panel 130. Besides, the two touch display panels 130 and 130a are automatically combined through a detection mechanism. To be specific, the electronic devices 100 and 100A have a plurality of magnetic sensors 150 disposed between the second body 120 and the touch display panel 130. When the two touch display panels 130 and 130a abut each other to be applied in combination, the two touch display panels 130 and 130a automatically extend the display image through the sensing by the corresponding magnetic sensor 150.

With reference to FIG. 1A and FIG. 3B, an angle A is present between the two touch display panels 130 and 130a, and the processing module 111 automatically adjusts a display parameter of the two touch display panels 130 and 130a according to the size of the angle A. The display parameter includes screen resolution, brightness, color, contrast, etc. Thereby, viewing continuity is improved between the two touch display panels 130 and 130a, and physical phenomena of recess and transition between the two touch display panels 130 and 130a are eliminated.

For example, with reference to FIG. 3C, when the angle A between the two touch display panels 130 and 130a is greater than 180 degrees, the middle area becomes darker and the contrast increases, so that the overall display image is reduced inward. With reference to FIG. 3D, when the angle A between the two touch display panels 130 and 130a is less than 180 degrees, the middle area becomes brighter and the contrast decreases, so that the overall display image is stretched outward.

In short, due to the U-shaped structure of the two touch display panels 130 and 130a, the borders 121 on the left and right sides of the second body 120 can be hidden (see FIG. 1B), bringing forth better image continuity. The processing module 111 may correspondingly adjust color, brightness, and contrast according to the angle A between the combined two touch display panels 130 and 130a to achieve consistency of the display image. For the main display part 131, the first display part 132, and the second display part 133 of the touch display panel 130, brightness and color of the display may be adjusted independently, which facilitates calibration of the display image when applied in combination.

Figure 4A:
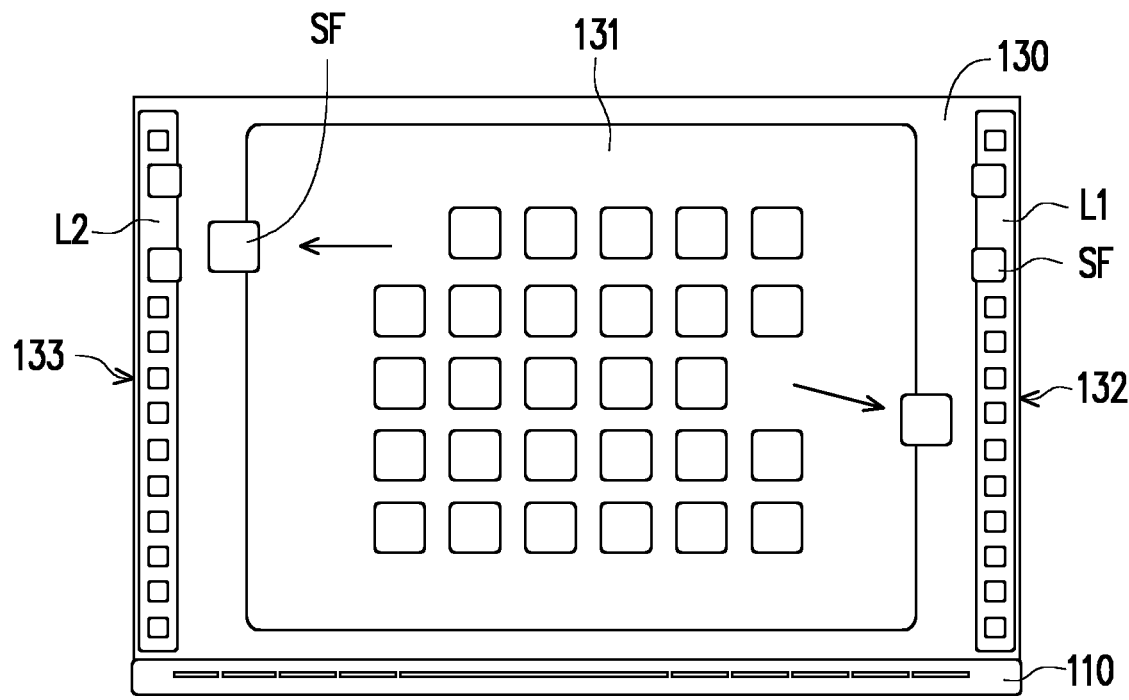
FIG. 4A is a schematic diagram of an operation of a customized quick toolbar of the electronic device of FIG. 1A.
Figure 4B:
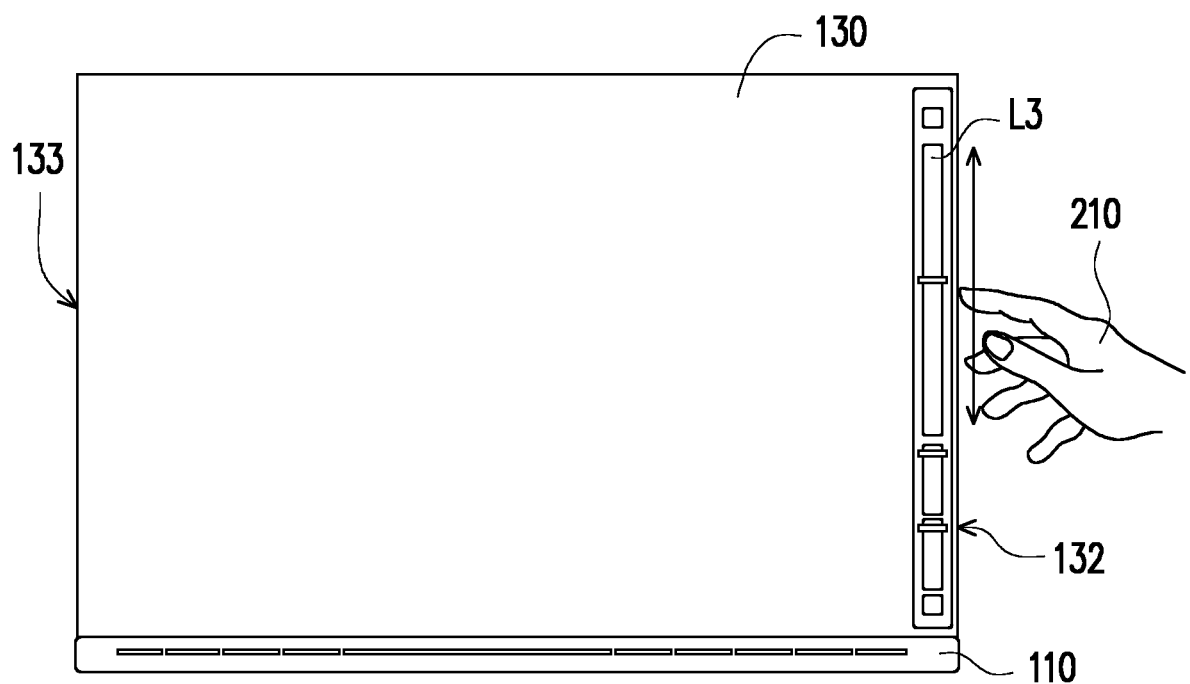
FIG. 4B is a schematic diagram of single-handed touch operation of the electronic device of FIG. 1A.
Figure 4C:
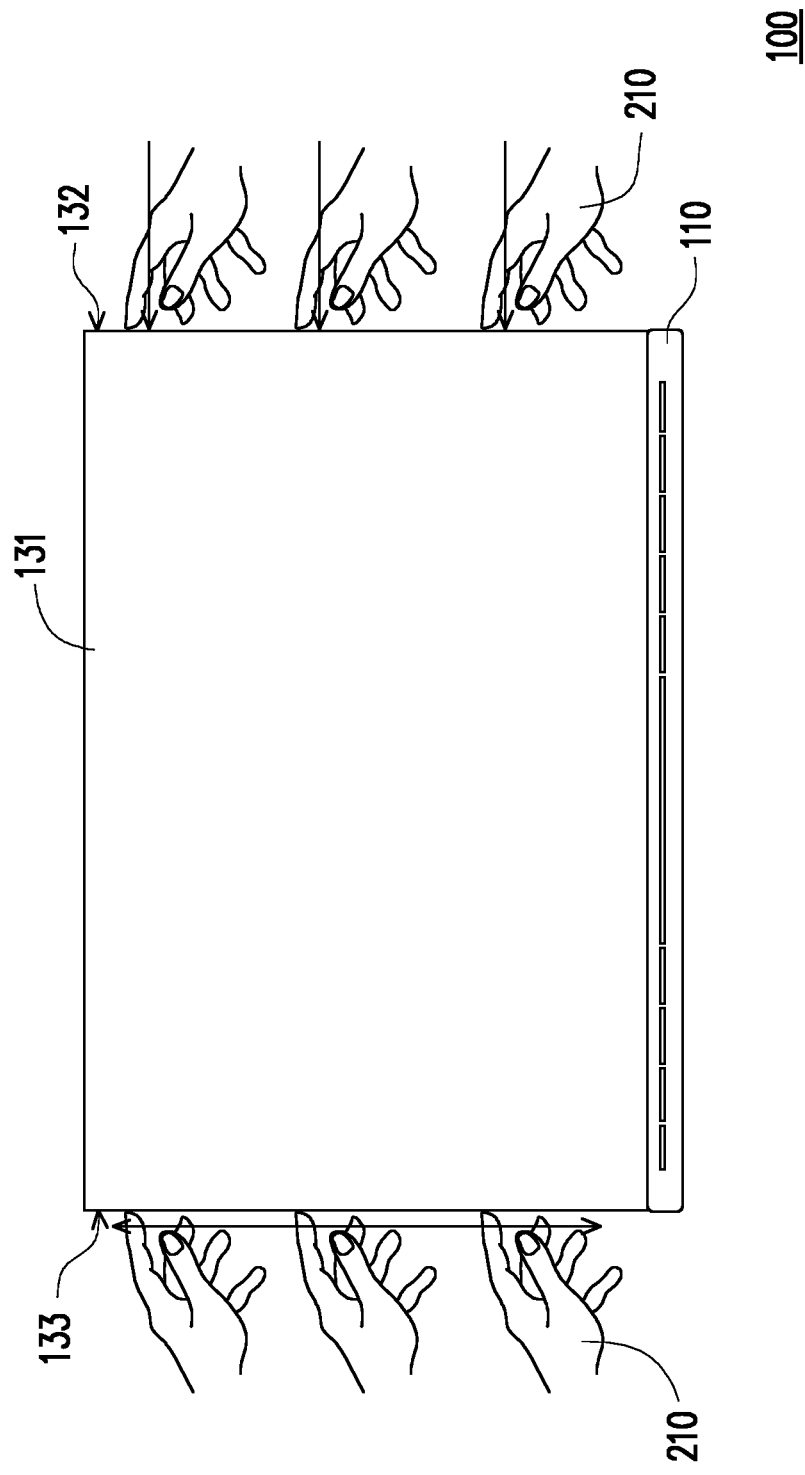
FIG. 4C is a schematic diagram of two-handed touch operation of the electronic device of FIG. 1A.

FIG. 4A is a schematic diagram of an operation of a customized quick toolbar of the electronic device of FIG. 1A. FIG. 4B is a schematic diagram of single-handed touch operation of the electronic device of FIG. 1A. FIG. 4C is a schematic diagram of two-handed touch operation of the electronic device of FIG. 1A.

With reference to FIG. 4A, the first display part 132 and the second display part 133 of the touch display panel 130 have the touch function that invokes a first quick toolbar L1 and a second quick toolbar L2 for operation. A keyboard shortcut may be set or a frequently used software program SF may be customized according to different applications or scenarios of use. The first display part 132 displays the first quick toolbar L1, and second display part 133 displays the second quick toolbar L2. The first quick toolbar L1 or the second quick toolbar L2 is adapted to be individually touched to activate a specific software program SF, or to be synchronously touched to adopt a key combination such as copy, paste, split display, or another shortcut function.

Moreover, the first quick toolbar L1 and the second quick toolbar L2 may also be customized for a shortcut function for specific applications (e.g., various business software programs and games, etc.), preventing the user from searching afresh from the applications for frequently used functions.

With reference to FIG. 4B, the first display part 132 and the second display part 133 of the touch display panel 130 may also read sliding of a hand 210 of the user 200 for touch operation. To be specific, when the hand 210 of the user 200 slidingly touches the first display part 132 or the second display part 133, it is adapted to adjust the volume of the first body 110 and the brightness of the touch display panel 130, and to display a bar graph L3 representing the volume or the brightness in the main display part 131, which facilitates adjustment by the user of the volume and the brightness of the electronic device 100 in different directions instead of moving to the front of the electronic device 100.

With reference to FIG. 4A and FIG. 4C, the first display part 132 and the second display part 133 have a compound key operation function. For example, the right hand 210 of the user touches the first display part 132, and the left hand 210 clicks the second display part 133 to thereby select a specific software program or shortcut function. To be specific, through double-clicking or long pressing the first display part 132 and the second display part 133, the user calls the first quick toolbar L1 and the second quick toolbar L2, and synchronously display the same on the main display part 131. Then the user single-clicks the software program SF on the first quick toolbar L1 and second the quick toolbar L2 through the hand 200.

Figure 5A:
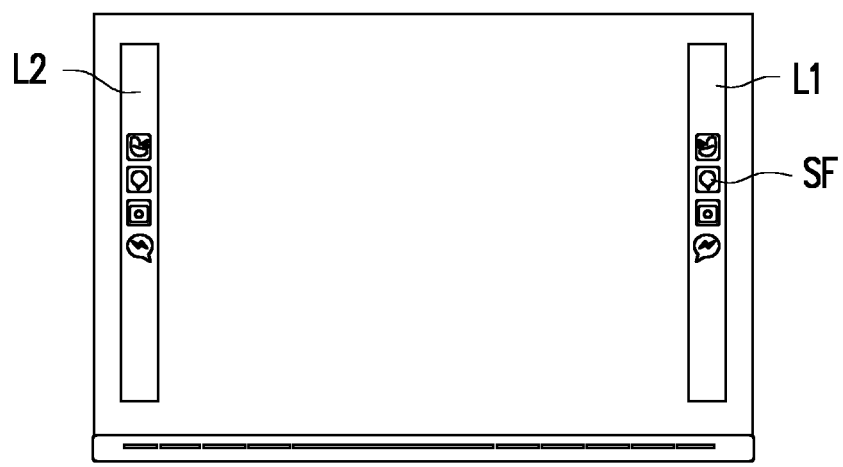
FIG. 5A to FIG. 5C are schematic plan views of the electronic device of FIG. 1A automatically adjusting the quick toolbar during different time periods.
Figure 5B:
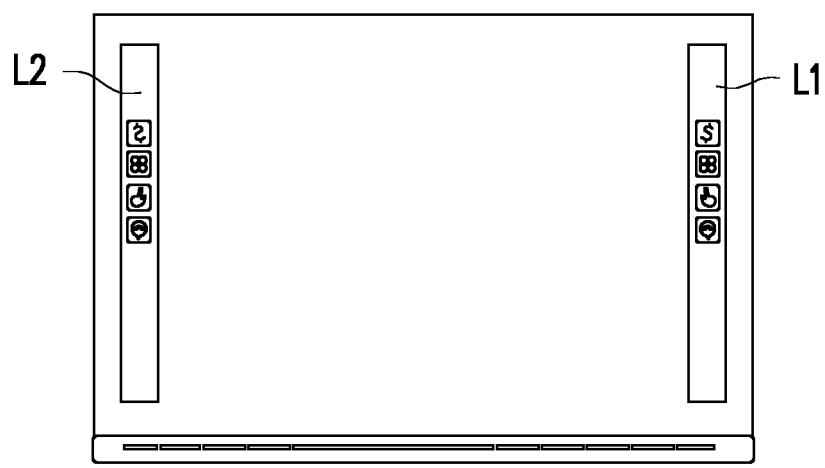
Figure 5C:
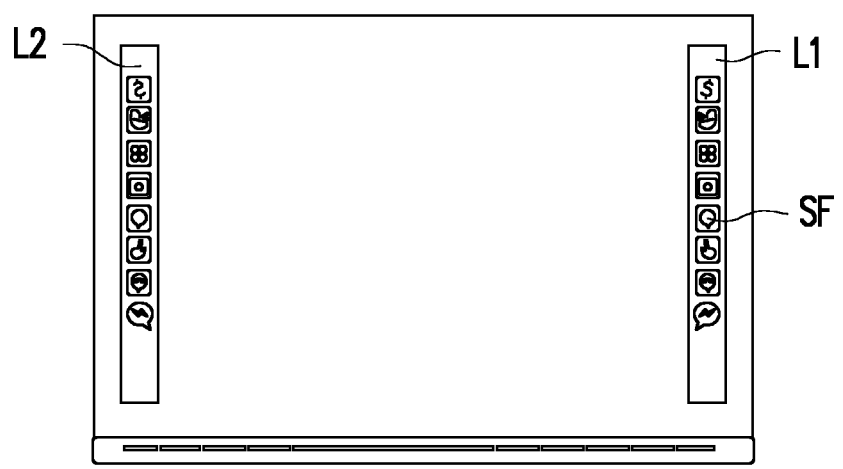

FIG. 5A to FIG. 5C are schematic plan views of the electronic device of FIG. 1A automatically adjusting the quick toolbar during different time periods.

The processing module 111 is adapted to record a plurality of software programs SF operating during different time periods, and display the plurality of corresponding software programs SF respectively on the first quick toolbar L1 or the second quick toolbar L2 according to the time period. With reference to FIG. 5A, a plurality of software programs SF that are being used or are already used are displayed on the first quick toolbar L1. With reference to FIG. 5B, a plurality of software programs SF having a higher frequency of use in the morning period are displayed on the first quick toolbar L1. With reference to FIG. 5C, a plurality of software programs SF having a higher frequency of use in the night period are displayed on the first quick toolbar L1. Based on a learning function of the processing module 111, this facilitates quickly selecting the required software program SF by the user during different time periods.

Figure 6:
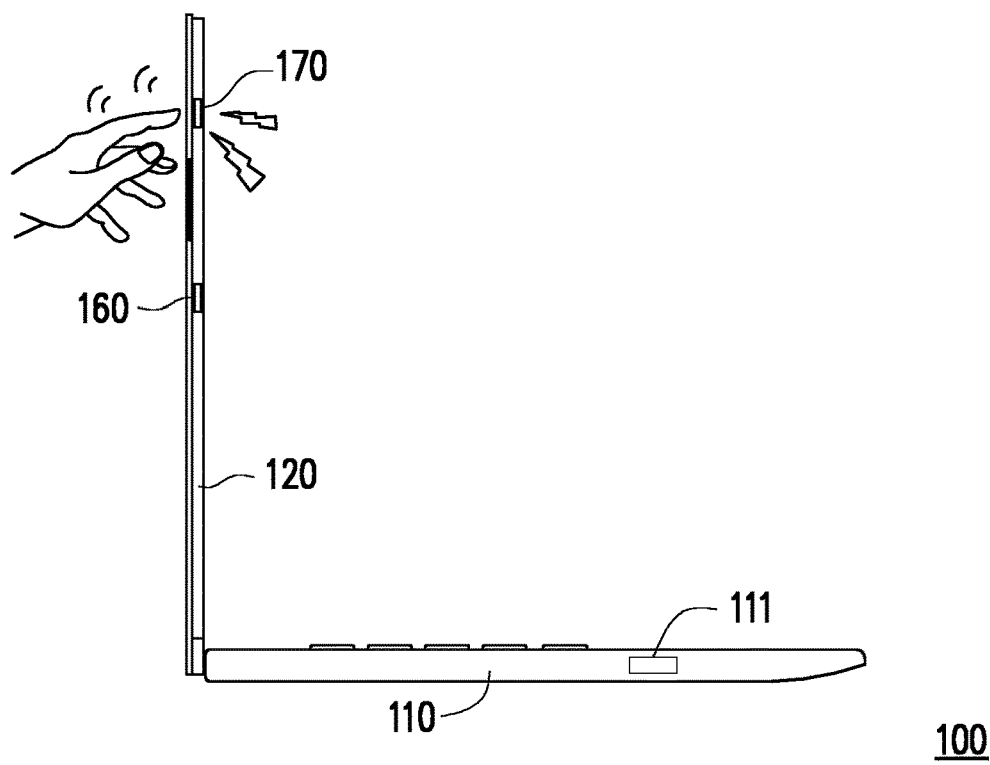
FIG. 6 is a schematic diagram of an operation of the electronic device of the disclosure in combination with a pressure sensor and a vibration motor.

FIG. 6 is a schematic diagram of an operation of the electronic device of the disclosure in combination with a pressure sensor and a vibration motor.

With reference to FIG. 6 and FIG. 1A, the electronic device 100 of this embodiment includes a plurality of pressure sensors 160 and at least one vibration module 170 respectively disposed in the first display part 132 and the second display part 133 and coupled to the processing module 111. The plurality of pressure sensors 160 are configured to detect a value of pressure applied to the first display part 132 and the second display part 133. When the value of pressure is greater than a predetermined value, the processing module 111 activates the vibration module 170, so that the touch display panel 130 generates vibration, so that the user experiences actual feedback from the touch operation. In short, through the plurality of pressure sensors 160 and the at least one vibration module 170 installed in the interior of the touch display panel 130, the first display part 132 and the second display part 133 can provide guidance and interactive feedback during the touch operation.

Figure 7:
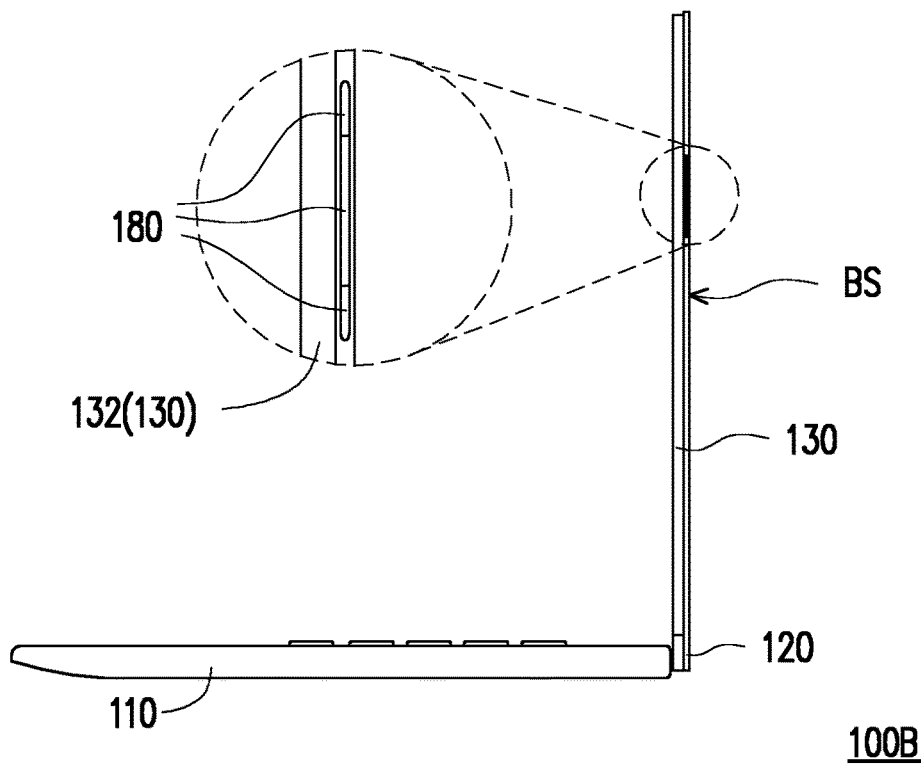
FIG. 7 is a schematic plan view of the electronic device of the disclosure in combination with a function block.

FIG. 7 is a schematic plan view of the electronic device of the disclosure in combination with a function block.

With reference to FIG. 7, the electronic device 100 of this embodiment includes a plurality of function blocks 180 disposed on the second body 120 and adjacent to the first display part 132 and the second display part 133. The plurality of function blocks 180 include concave-convex structures of different shapes (divided into three blocks in FIG. 7) to correspond to different functions, such as two pressing blocks and one sliding block, among which the two pressing blocks may customize the corresponding software program and shortcut key, and the sliding block is suitable for adjustment of audio and video functions such as volume, brightness, or playback speed. Through pressing the function blocks 180, tactile perception of the user is facilitated.

Figure 8A:
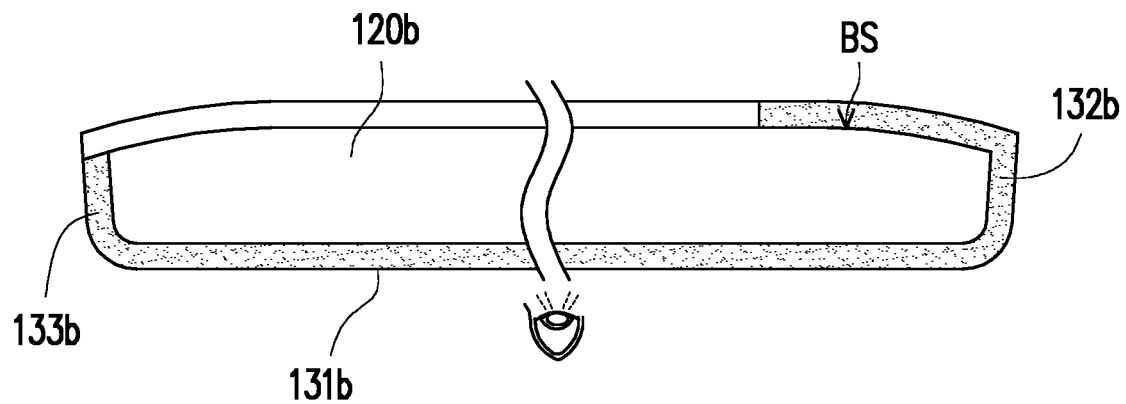
FIG. 8A is a schematic top view of a touch display panel of an electronic device extending to a right side of a second body according to another embodiment of the disclosure.
Figure 8B:
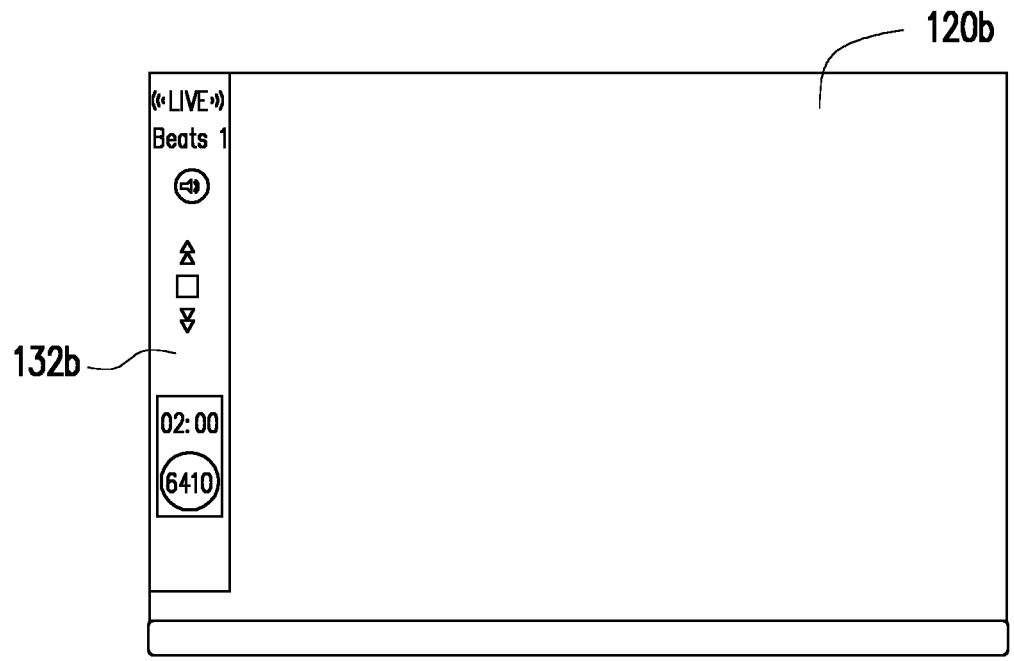
FIG. 8B is a schematic back plan view of the electronic device of FIG. 8A.
Figure 8C:
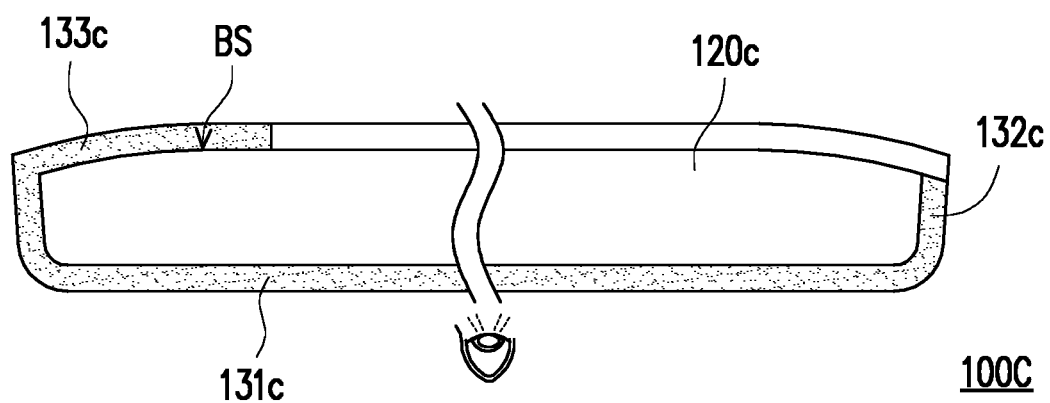
FIG. 8C is a schematic top view of a touch display panel extending to a left side of a second body according to another embodiment of the disclosure.

FIG. 8A is a schematic top view of a touch display panel of an electronic device extending to a right side of a second body according to another embodiment of the disclosure. FIG. 8B is a schematic back plan view of the electronic device of FIG. 8A. FIG. 8C is a schematic top view of a touch display panel extending to a left side of a second body according to another embodiment of the disclosure.

With reference to FIG. 8A and FIG. 8B, a first display part 132*b* of an electronic device 100B of this embodiment extends to a back surface BS of a second body 120*b* relative to a main display part 131*b*. Furthermore, the first display part 132*b* extending to the back surface BS may be configured to display information such as music playback information, the time, and a control function key, and may also be connected to information of an external device of the user such as an electronic watch among other wearables. Since the first display part 132*b* has a relatively larger area on the back surface BS, the user in different directions can watch from the back surface BS direction or directly perform touch operation such as clicking a button or handwriting a signature in the area of the first display part 132*b* located on the back surface BS.

With reference to FIG. 8C, the second display part 133*c* of an electronic device 100C of this embodiment extends to a back surface BS of a second body 120*c* relative to a main display part 131*c*. Furthermore, the second display part 133*b* extending to the back surface BS may be configured to display information such as music playback information, the time, and a control function key, and may also be connected to information of an external device of the user such as an electronic watch among other wearables. Since the second display part 133*c* has a relatively larger area on the back surface BS, the user in different directions can watch from the back surface BS direction or directly perform touch operation such as clicking a button or handwriting a signature in the area of the second display part 133*c* located on the back surface BS.

Figure 9A:
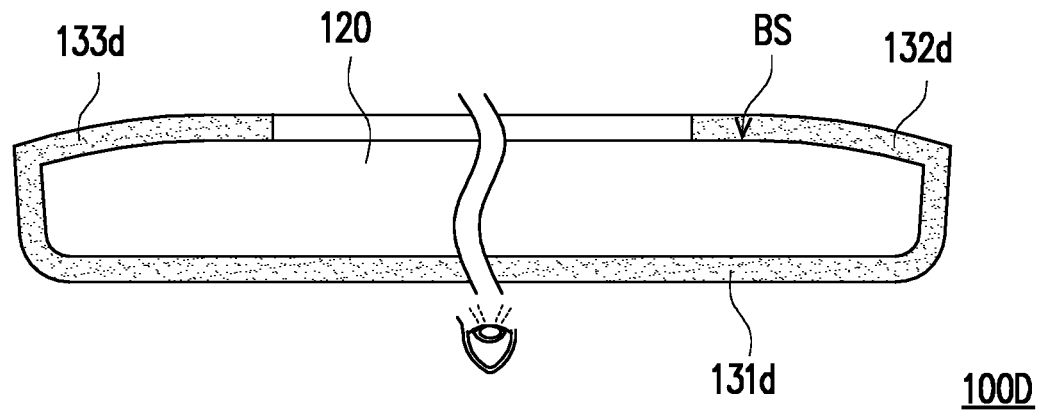
FIG. 9A is a schematic top view of a touch display panel of an electronic device extending to left and right sides of a second body according to another embodiment of the disclosure.
Figure 9B:
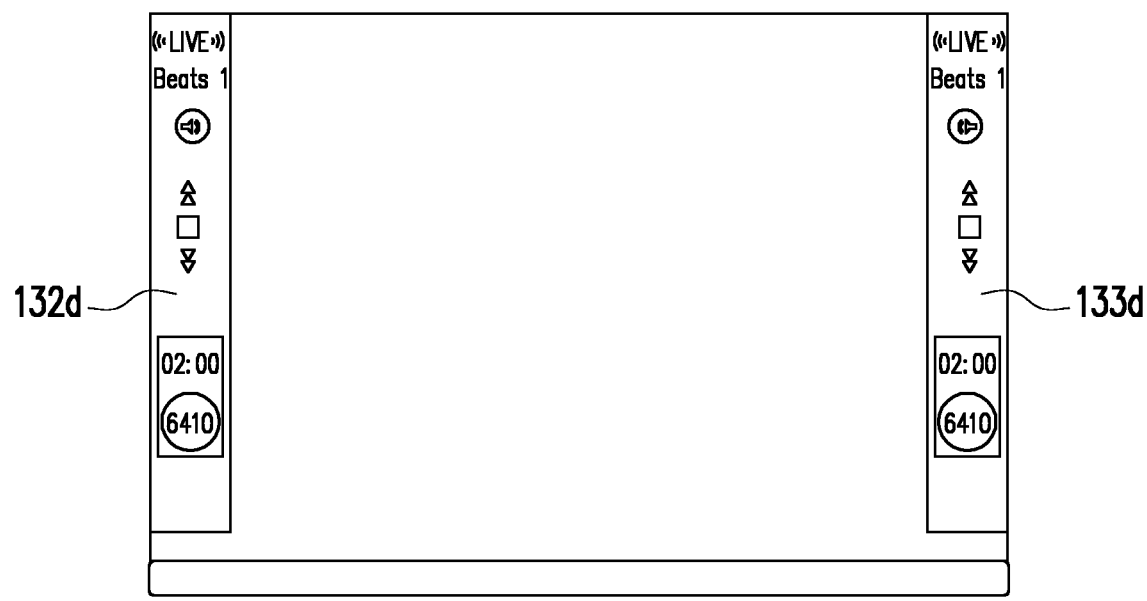
FIG. 9B is a schematic back plan view of the electronic device of FIG. 9A.

FIG. 9A is a schematic top view of a touch display panel of an electronic device extending to left and right sides of a second body according to another embodiment of the disclosure. FIG. 9B is a schematic back plan view of the electronic device of FIG. 9A.

With reference to FIG. 9A and FIG. 9B, a first display part 132*d* and a second display part 133*d* of an electronic device 100D of this embodiment respectively extend to a back surface BS of a second body 120*d* relative to a main display part 131*d*. Furthermore, the first display part 132*d* and the second display part 133*d* extending to the back surface BS may be configured to display information such as music playback information, the time, and a control function key, and may also be connected to information of an external device of the user such as an electronic watch among other wearables. Since the first display part 132*d* and the second display part 133*d* have a relatively larger area on the back surface BS, the user in different directions can watch from the back surface BS direction or directly perform touch operation such as clicking a button or handwriting a signature in the area of the first display part 132*d* or the second display part 133*d* located on the back surface BS.

In short, the first display part 132*d* and the second display part 133*d* extend to the area of the back surface BS of the second body 120*d*. When the electronic device 100D is closed, they may be configured to display information (a smart assistant/a calendar). When the electronic device 100D is in the sleep mode, functions may be customized for touch operation (e.g., music playback/volume control/communication software).

In summary of the foregoing, the electronic device of the disclosure has a bendable touch display panel adapted to generate deformation and disposed on the second body, thereby hiding the borders on the left and right sides of the second body to have a visual effect of bilateral boundlessness. When the electronic device is unfolded, the image and the message that are output are viewed through the main display part of the touch display panel. At the same time, the first display part and a second display part of the touch display panel may be planned as the touch area, which facilitates the touch operation. The user can perform touch interaction through the first display part and the second display part of the touch display panel, which prevents the hand of the user from blocking the main display part of the touch display panel and the display image thereof, and also decreases fingerprint residue on the main display part.

Moreover, when the electronic device is switched to the first mode and is closed, the first display part and the second display part of the touch display panel will become the display area, are exposed between the first body and the second body, and display a simple message for the user to view, reminding the user of important information.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
a first body;
a second body rotatably connected to the first body;
a processing module disposed in the first body or the second body;
a touch display panel disposed on the second body and coupled to the processing module, wherein the touch display panel has a main display part, a first display part, and a second display part, and the first display part and the second display part are located on two opposite sides of the second body; and
at least one sensing unit disposed in the first body or the second body and coupled to the processing module,
wherein when the at least one sensing unit detects that the first body and the second body are unfolded relative to each other, the main display part is activated, the first display part and the second display part are adapted to operate synchronously or operate individually, and the first display part or the second display part is adapted to detect an external touch force to thereby transmit a corresponding control command to the processing module, wherein the first display part displays a first quick toolbar, the second display part displays a second quick toolbar, and the processing module is adapted to record a plurality of software programs operating during different time periods and display the corresponding software programs on the first quick toolbar or the second quick toolbar according to the time period.

2. The electronic device according to claim 1, wherein the first quick toolbar or the second quick toolbar is adapted to be individually touched, or the first quick toolbar and the second quick toolbar are adapted to be synchronously touched.

3. The electronic device according to claim 2, wherein through double-clicking or pressing the first display part and the second display part, the first quick toolbar and the second quick toolbar are called and synchronously displayed on the main display part.

4. The electronic device according to claim 1, wherein the second body has a plurality of function blocks disposed on the second body and adjacent to at least one of the first display part and the second display part.

5. The electronic device according to claim 1, wherein sliding touch, when performed on the first display part or the second display part, is adapted to adjust volume of the first body and brightness of the touch display panel.

6. The electronic device according to claim 1, further comprising a plurality of pressure sensors and at least one vibration module disposed respectively in the first display part and the second display part and coupled to the processing module, wherein the plurality of pressure sensors are configured to detect a value of pressure applied to the first display part and the second display part, and when the value of pressure is greater than a predetermined value, the processing module activates the vibration module, such that the touch display panel generates vibration.

7. The electronic device described in claim 1, further comprising another touch display panel, wherein a first display part of the another touch display panel is in contact with the second display part of the touch display panel, or a second display part of the another touch display panel is in contact with the first display part of the touch display panel, and the two touch display panels are automatically combined through a detection mechanism.

8. The electronic device according to claim 7, wherein an angle is present between the two touch display panels, and the processing module automatically adjusts a display parameter of the two touch display panels according to a size of the angle.

9. The electronic device according to claim 1, wherein one of the first display part and the second display part locates at a back surface of the second body relative to the main display part.

10. The electronic device according to claim 1, wherein the first display part and the second display part respectively locate at a back surface of the second body relative to the main display part.

* * * * *